(12) United States Patent
Paraman et al.

(10) Patent No.: US 10,972,790 B2
(45) Date of Patent: Apr. 6, 2021

(54) HDMI HARDWARE ISOLATION

(71) Applicant: ARRIS Enterprises LLC, Suwanee, GA (US)

(72) Inventors: Sadhasivam Paraman, Bangalore (IN); Andrew Farrimond, West Yorkshire (GB)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 16/253,978

(22) Filed: Jan. 22, 2019

(65) Prior Publication Data

US 2019/0230410 A1 Jul. 25, 2019

Related U.S. Application Data

(60) Provisional application No. 62/620,035, filed on Jan. 22, 2018.

(51) Int. Cl.
| | | |
|---|---|---|
| G06F 13/40 | (2006.01) | |
| H04N 21/442 | (2011.01) | |
| H04N 17/00 | (2006.01) | |
| H04N 21/4363 | (2011.01) | |

(52) U.S. Cl.
CPC ..... *H04N 21/4424* (2013.01); *G06F 13/4068* (2013.01); *H04N 17/004* (2013.01); *H04N 21/43635* (2013.01)

(58) Field of Classification Search
CPC .............. G06F 13/4068; H04N 17/004; H04N 21/43635; H04N 21/4424
See application file for complete search history.

(56) References Cited

U.S. PATENT DOCUMENTS

2019/0116321 A1* 4/2019 Grimm ................. H04N 5/268

OTHER PUBLICATIONS

PCT International Search Report & Written Opinion, Re: Application No. PCT/US2019/014550, dated Mar. 28, 2019.
Texas Instruments, "TDP158 6-Gbps, AC-Coupled to TMDS (TM) or HDMI (TM) Level Shifter Redriver", Jun. 1, 2017, retrieved from the Internet at <URL:http://www.ti.com/lit/ds/symlink/tdp158.pdf> on Mar. 19, 2019.
Texas Instruments, "TPS55010 2.95V to 6-V INput, 2W, Isolated DC/DC Converter with Integrated FETs", Oct. 1, 2014, pp. 1-46, retrieved from the Internet at <URL:http://www.ti.com/lit/ds/symlink/tps55010.pdf> on Mar. 19, 2019.

(Continued)

*Primary Examiner* — Idriss N Alrobaye
*Assistant Examiner* — Richard B Franklin
(74) *Attorney, Agent, or Firm* — Buchanan Ingersoll & Rooney PC

(57) ABSTRACT

In embodiments, an HDMI connector may be isolated from a system-on-chip (SoC) by placing an isolation block in between the HDMI connector and the SoC. The isolation block may prevent the flow of current at mains frequencies while allowing signaling within the HDMI interface to pass. The isolation block may include one or more components that block the flow of current at mains frequencies along one or more signal paths between the HDMI connector and the SoC.

15 Claims, 8 Drawing Sheets

(56) References Cited

OTHER PUBLICATIONS

Texas Instruments, "ISO154x Low-Power Bidirectional I2C Isolators", Dec. 1, 2016, retrieved from the Internet at <URL:http://www.ti.com/lit/ds/symlink/iso1541.pdf> on Mar. 19, 2019.

Texas Instruments, "TPD12S015A HDMI Companion Chip with Step-Up DC-DC I2C Level Shifter, and High-Speed ESD Clamps", Jul. 1, 2016, retrieved from the Internet at <URL:http://www.ti.com/lit/ds/sllse74d/sllse74d.pdf?, on Mar. 19, 2019.

Texas Instruments, "ISOW784x High-Performance, 5000-V RMS Reinforced Quad-Channel Digital Isolators with Integrated High-Efficiency, Low-Emissions DC-DC Converter", Jun. 1, 2017, retrieved from the Internet at URL:https://cdn.weka-fachmedien.de/media_uploads/documents/1499416504-291-isow7841.pdf> on Mar. 19, 2019.

Texas Instruments, "Isolated RS-232 with Integrated Signal and Power Reference Design", Mar. 1, 2017, retrieved from the Internet at <URL:http://www.ti.com/lit/ug/tiduct3/tiduct3.pdf> on Mar. 19, 2019.

\* cited by examiner

HDMI HARDWARE ISOLATION

CROSS REFERENCE TO RELATED APPLICATION

This application is a non-provisional application claiming the benefit of U.S. Provisional Application Ser. No. 62/620,035, entitled "HDMI Hardware Isolation," which was filed on Jan. 22, 2018, and is incorporated herein by reference in its entirety.

TECHNICAL FIELD

This disclosure relates to an HDMI isolation hardware design solution.

BACKGROUND

Faulty home wiring may cause HDMI (high-definition multimedia interface) to overheat, thus causing damage to connected CPE (customer premise equipment) devices (e.g., set-top boxes (STB)). In general, overheating will occur at the highest resistance point, and where current flows through an HDMI cable and through a cable terminal ground of a STB, the highest resistance point is the HDMI connector.

To prevent current (i.e., mains current) flowing back into a home having faulty wiring, where there is a risk of device overheating, an external Galvanic Isolator (GI) may be used at a cable IN from a cable network. However, having external galvanic isolation in each home is an extra overhead to the customer.

Internal galvanic isolation design is such that it breaks the cable terminal ground (at F-type connector) from the main STB ground, thus the STB metalwork and connectors (excluding the isolated F-Type) will float at the same potential as the TV chassis. In a worst-case wiring fault scenario, the TV chassis could be live meaning the STB connectors will also be live and this creates a potential for a fatal shock.

Therefore, a need exists for an improved isolation of HDMI hardware from faulty home wiring.

BRIEF DESCRIPTION OF THE DRAWINGS

Like reference numbers and designations in the various drawings indicate like elements.

DETAILED DESCRIPTION

It is desirable to provide an improved isolation of HDMI hardware from faulty home wiring. In embodiments, an HDMI connector may be isolated from a system-on-chip (SoC) by placing an isolation block in between the HDMI connector and the SoC. The isolation block may prevent the flow of current at mains frequencies while allowing signaling within the HDMI interface to pass. The isolation block may include one or more components that block the flow of current at mains frequencies along one or more signal paths between the HDMI connector and the SoC.

In embodiments, an HDMI isolation hardware design may prevent mains fault current from flowing from a display device through a CPE device (e.g., STB) to earth, thereby preventing the HDMI cable from melting or setting on fire in a faulty home wiring scenario. This solution also prevents the end user from receiving an electric shock from any accessible port/exposed metal work of the CPE device from electrical faults derived via the HDMI interface.

The hardware isolation described herein prevents any potential for an end user to receive an electric shock from the STB (or via a cable plugged into the STB), while also preventing the HDMI cable from melting or setting on fire in a home with faulty wiring, assuming the source of the electrical fault is via the HDMI interface (e.g., the display device). The addition of the isolation circuitry described herein reduces the occurrence of SoC damage from electrical over stress (EOS) injected into the HDMI port of the STB.

Figure 1:
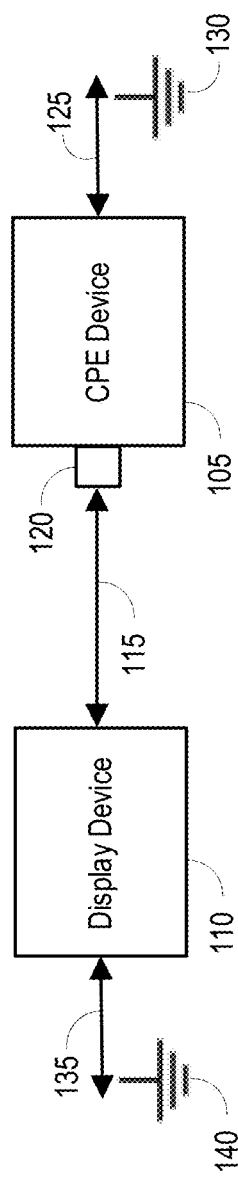
FIG. 1 is a block diagram illustrating an example CPE device that is connected to a display device via an HDMI cable.

FIG. 1 is a block diagram illustrating an example CPE device 105 that is connected to a display device 110 via an HDMI cable 115. In embodiments, the CPE device 105 may include an HDMI connector 120, and the HDMI cable 115 may be connected at one end to the display device 110 and connected at the other end to the HDMI connector 120. An RF (radio frequency) cable 125 may be connected to the CPE device 105, and the RF cable 125 may be grounded by RF ground 130. A power cable 135 may be connected to the display device 110, and the power cable 135 may be grounded by power ground 140.

Figure 2:
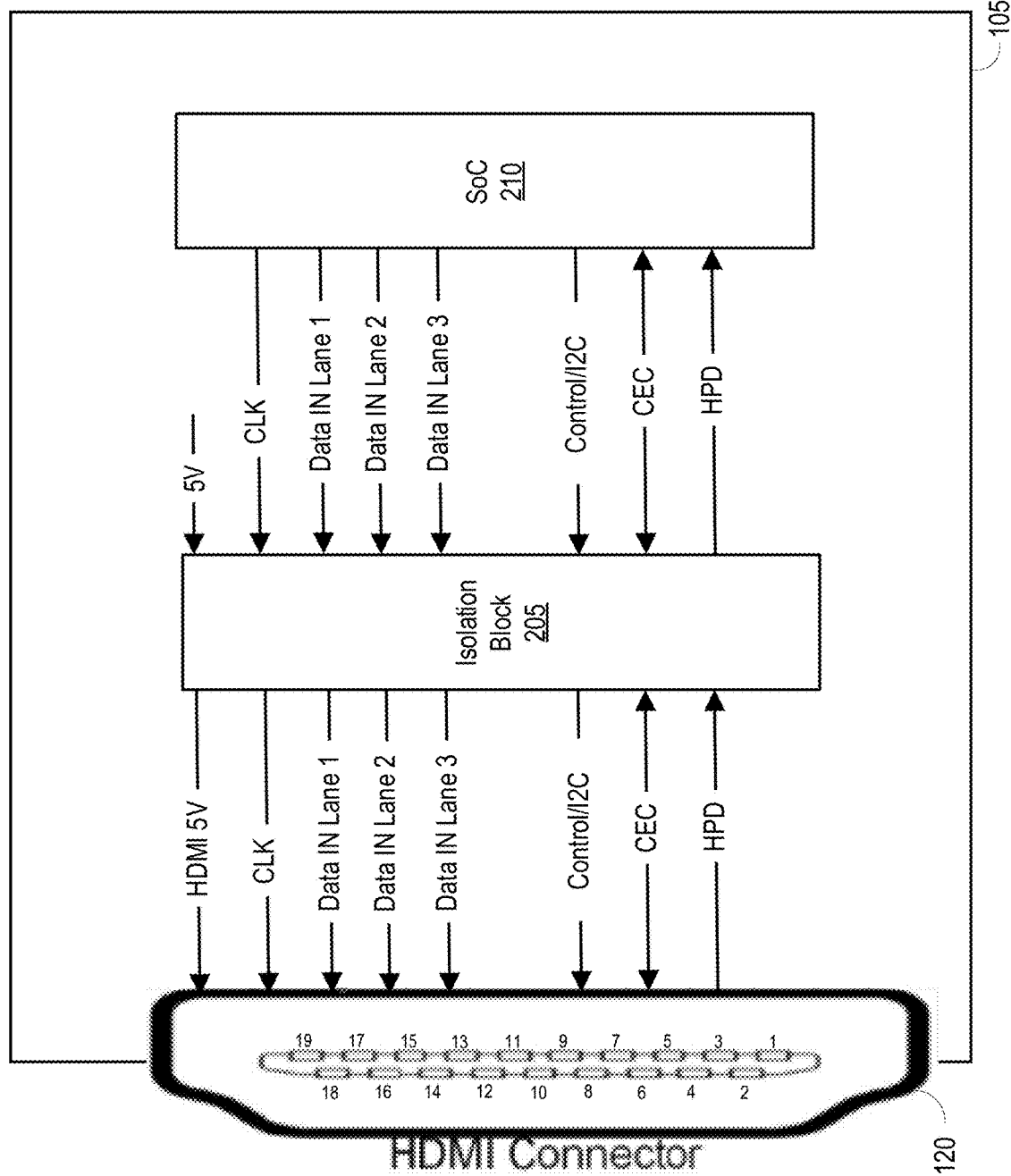
FIG. 2 is a block diagram illustrating an example CPE device comprising an isolation block that isolates an HDMI connector from a SoC (system-on-chip) of the CPE device.

FIG. 2 is a block diagram illustrating an example CPE device 105 comprising an isolation block 205 that isolates an HDMI connector 120 from a SoC (system-on-chip) 210 of the CPE device 105. In embodiments, one or more signal paths between the HDMI connector 120 and the SoC 210 may pass through the isolation block 205. For example, the one or more signal paths may include CLK (clock), data IN lane (e.g., data IN lane 1, data IN lane 2, data IN lane 3, etc.), control/I2C (inter-integrated circuit), CEC (consumer electronics control), HPD (hot-plug-detect), and/or others. Power (e.g., 5V) may pass through the isolation block 205 to the HDMI connector 120.

In embodiments, the isolation block 205 may prevent the flow of current at mains frequencies (e.g., 50/60 Hz) while allowing signaling within the HDMI interface to pass.

Figure 3:
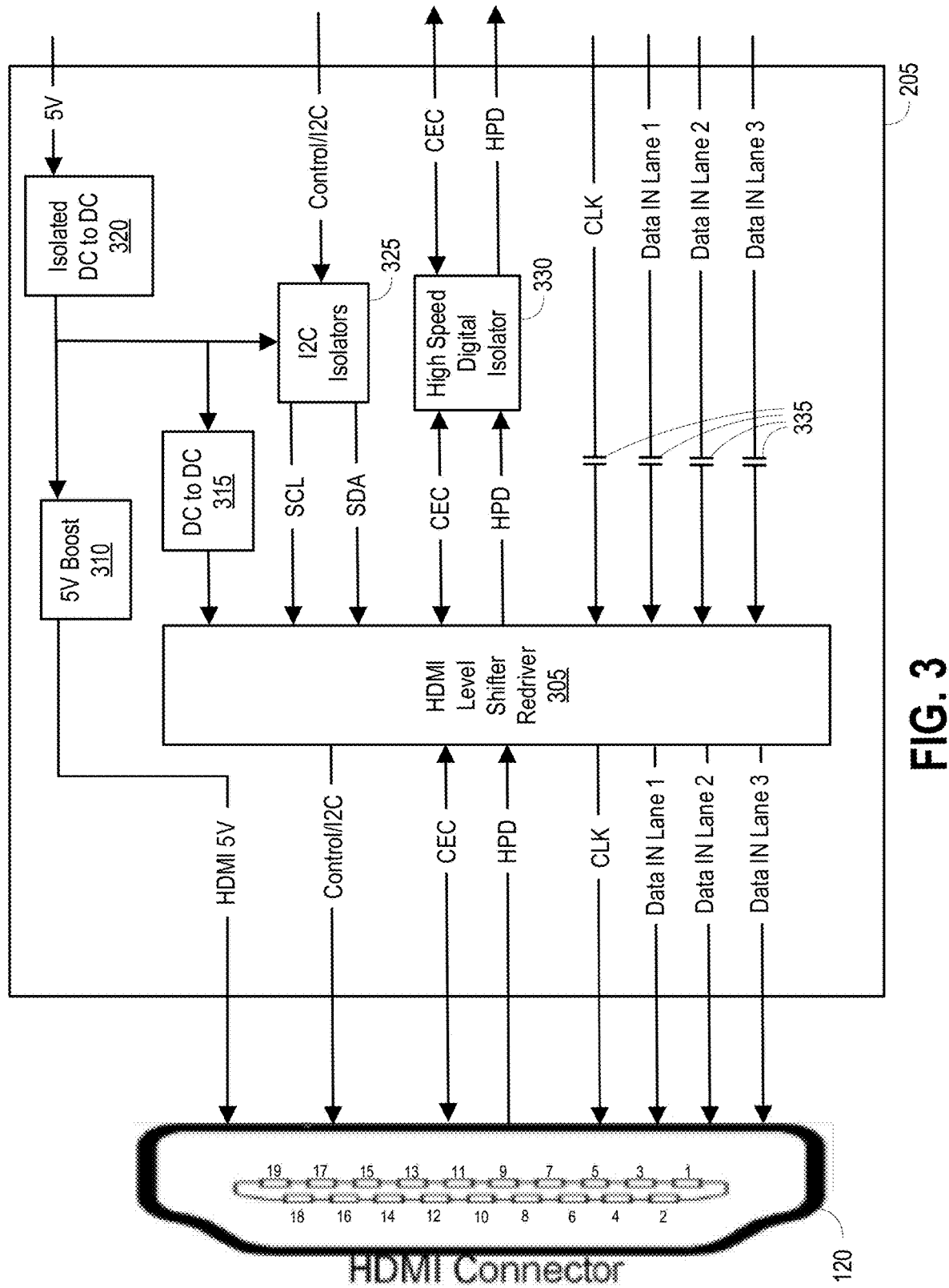
FIG. 3 is a block diagram illustrating an isolation block.

FIG. 3 is a block diagram illustrating an isolation block 205. The isolation block 205 may include an HDMI level shifter redriver 305, a 5V boost 310, a DC to DC 315, an isolated DC to DC 320, I2C isolators 325, and a high speed digital isolator 330.

In embodiments, the HDMI level shifter redriver 305 may be AC coupled. For example, each of one or more signal paths (e.g., CLK, data IN lane 1, data IN lane 2, data IN lane 3) passing from a SoC (e.g., SoC 210 of FIG. 2) to the HDMI connector 120 may include a capacitor 335, wherein the capacitor 335 filters out a DC signal component of a signal traveling the signal path.

In embodiments, the isolated DC to DC 320 may be an isolated DC to DC converter having integrated FETs (field-effect transistor). The isolated DC to DC 320 may be a transformer driver that provides isolated power using fixed frequency current mode control and half bridge power stage with primary side feedback to regulate the output voltage.

In embodiments, the 5V boost 310 may be a boost converter. The 5V boost 310 may generate 5V for HDMI to meet the HDMI specification. A small switched cap boost may be used to generate the 5V for HDMI. An isolated fly-buck device may be used to generate a 3V3 output. The 3V3 may power an HDMI redriver (e.g., HDMI level shifter redriver 305) and I2C isolators (e.g., I2C isolators 325) directly.

In embodiments, the high speed digital isolator 330 may be a high speed triple channel digital isolator.

Figure 4:
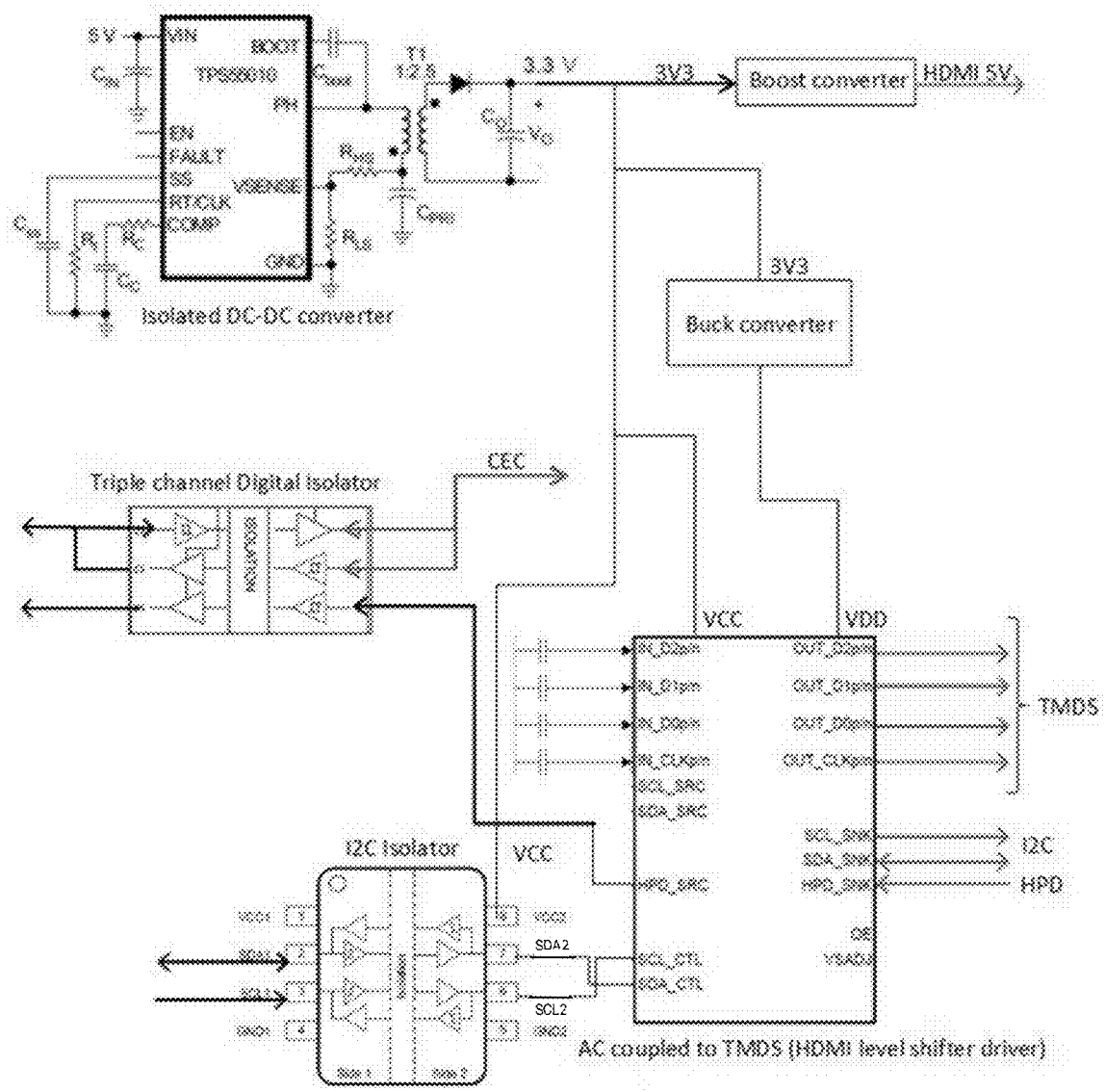
FIG. 4 is a block diagram illustrating an example schematic of an isolation block.

FIG. 4 is a block diagram illustrating an example schematic of an isolation block 205.

Figure 5:
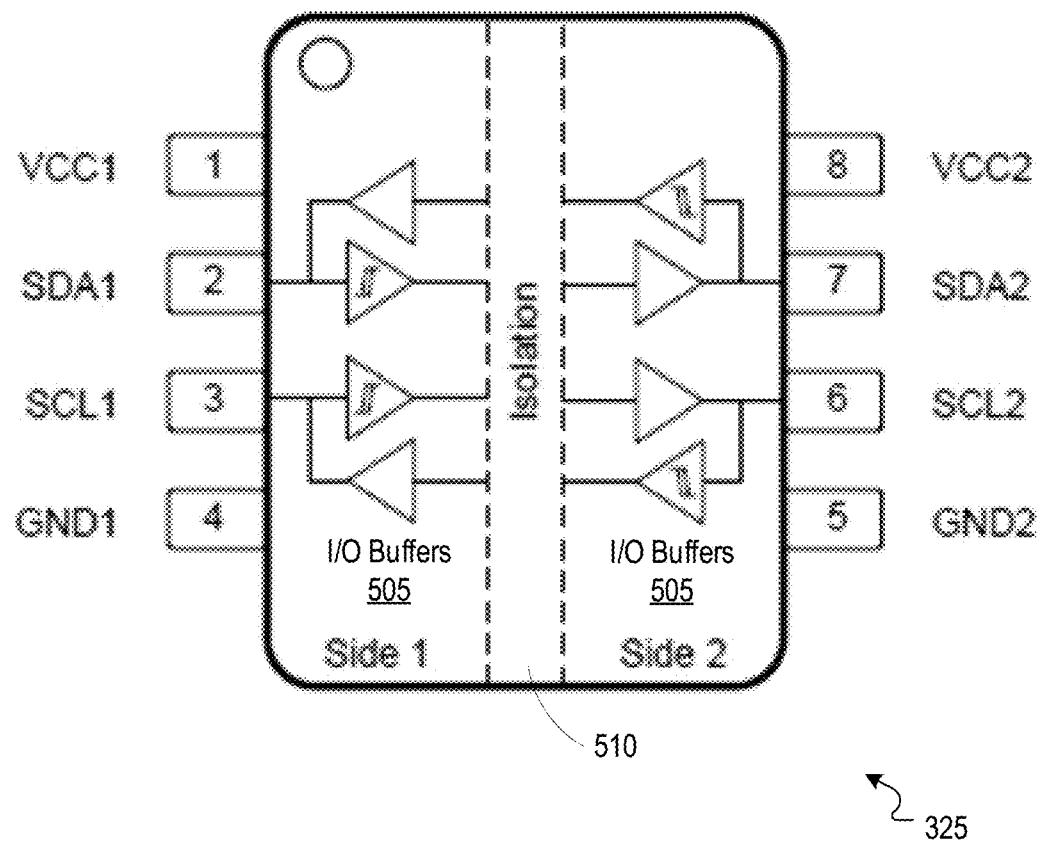
FIG. 5 is a block diagram illustrating an example schematic of an I2C isolator.

FIG. 5 is a block diagram illustrating an example schematic of an I2C isolator 325. In embodiments, the I2C isolator 325 may include logic input and output buffers (e.g., I/O buffers 505) that are separated by a silicon dioxide barrier 510. When used with isolated power supplies, the silicon dioxide barrier 510 blocks high voltages, isolates grounds, and prevents noise currents from entering the local ground and interfering with or damaging sensitive circuitry.

Figure 6:
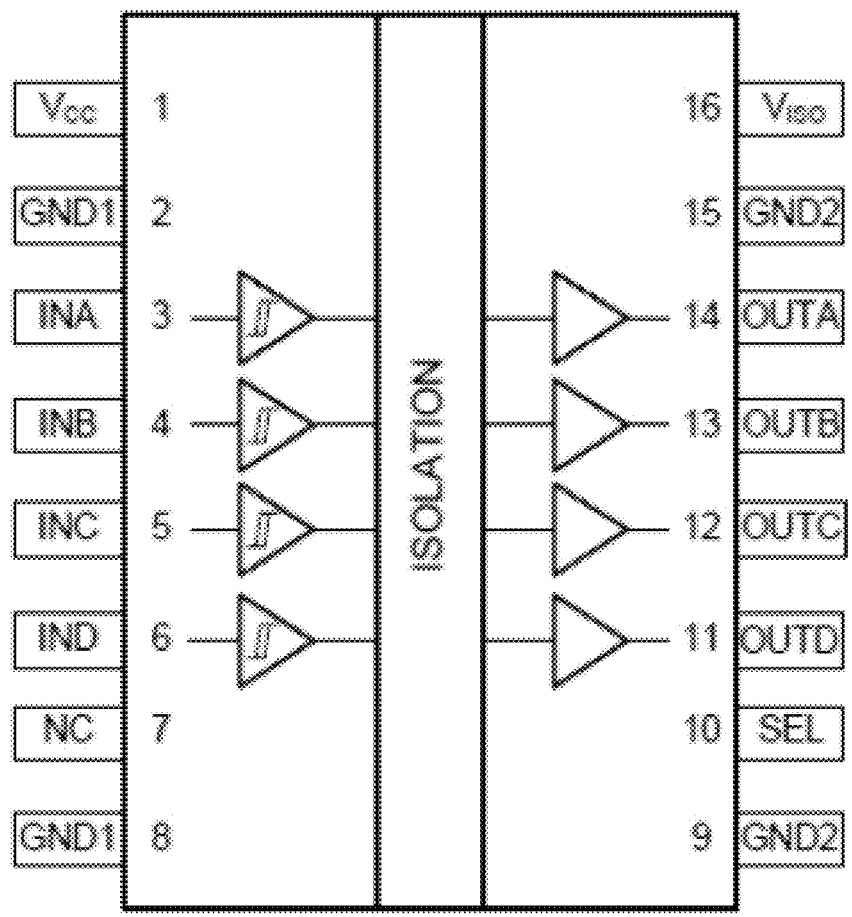
FIG. 6 is a block diagram illustrating an example schematic of a high speed digital isolator.

FIG. 6 is a block diagram illustrating an example schematic of a high speed digital isolator 330. The high speed digital isolator 330 may be a quad-channel digital isolator with integrated DC-DC converter. When used in conjunction with isolated power supplies, the high speed digital isolator 330 may prevent noise currents on a data bus (e.g., CEC and HPD) from entering the local ground and interfering with or damaging sensitive circuitry.

Figure 7:
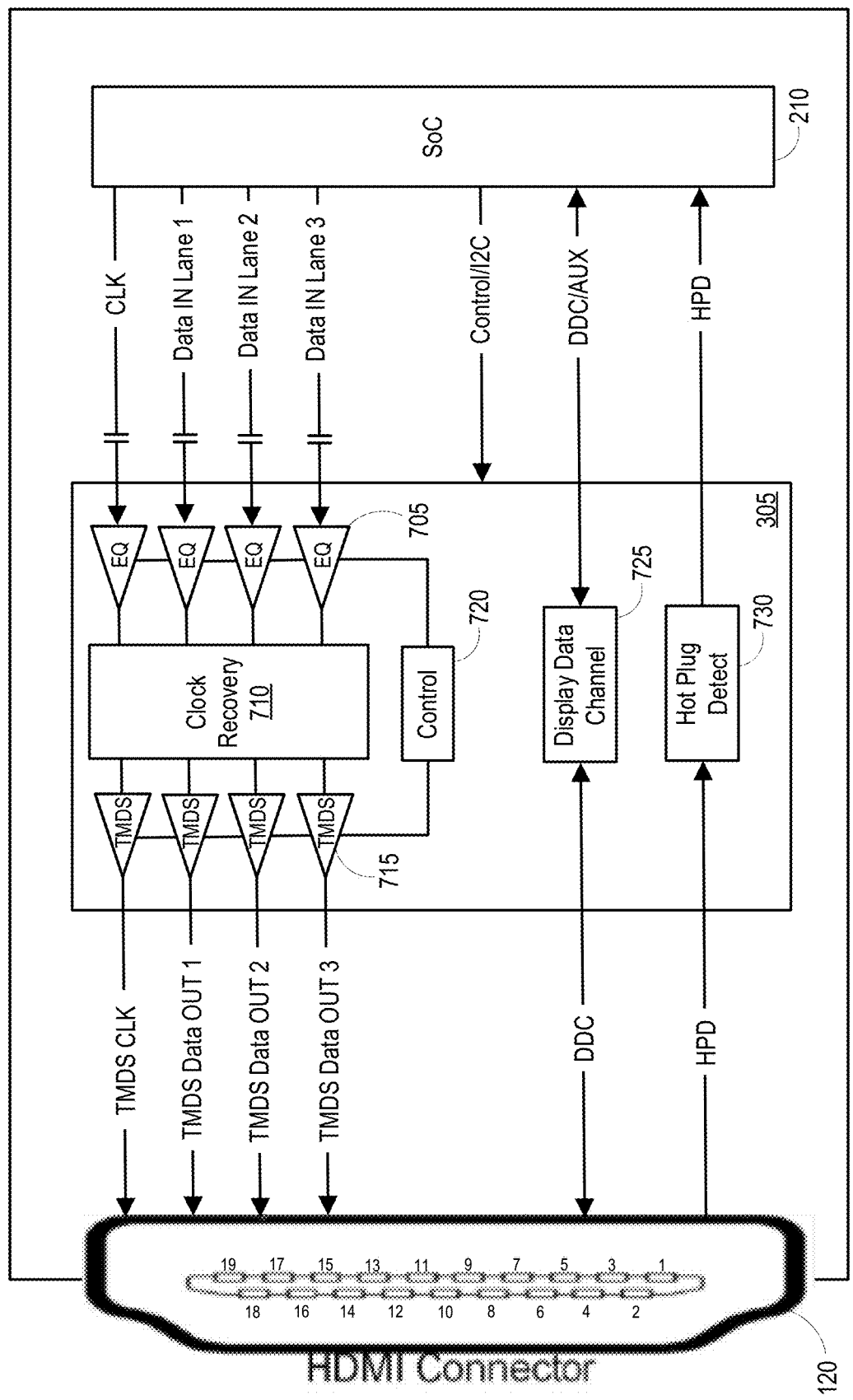
FIG. 7 is a block diagram illustrating an example HDMI level shifter redriver.

FIG. 7 is a block diagram illustrating an example HDMI level shifter redriver 305. The HDMI level shifter redriver 305 may include one or more equalizers (e.g., EQ 705), a clock-data recovery (e.g., clock recovery 710), one or more TMDS 715, a control 720, a display data channel 725, and a hot plug detect 730. In embodiments, the HDMI level shifter redriver 305 may convert AC-coupled TMDS (transition-minimized differential signaling) to HDMI physical layer output. For example, one or more signals may be received by the HDMI level shifter redriver 305 over one or more AC-coupled signal paths (e.g., CLK, data IN lane 1, data IN lane 2, data IN lane 3), and the HDMI level shifter redriver 305 may convert the one or more signals received over the one or more AC-coupled signal paths to one or more DC-coupled HDMI signals. The one or more signals received over the one or more AC-coupled signal paths may be received by the HDMI level shifter redriver 305 from a SoC 210. The one or more DC-coupled HDMI signals may be output from the HDMI level shifter redriver 305 to an HDMI connector 120 over one or more signal paths (e.g., TMDS CLK, TMDS data OUT 1, TMDS data OUT 2, TMDS data OUT 3).

Figure 8:
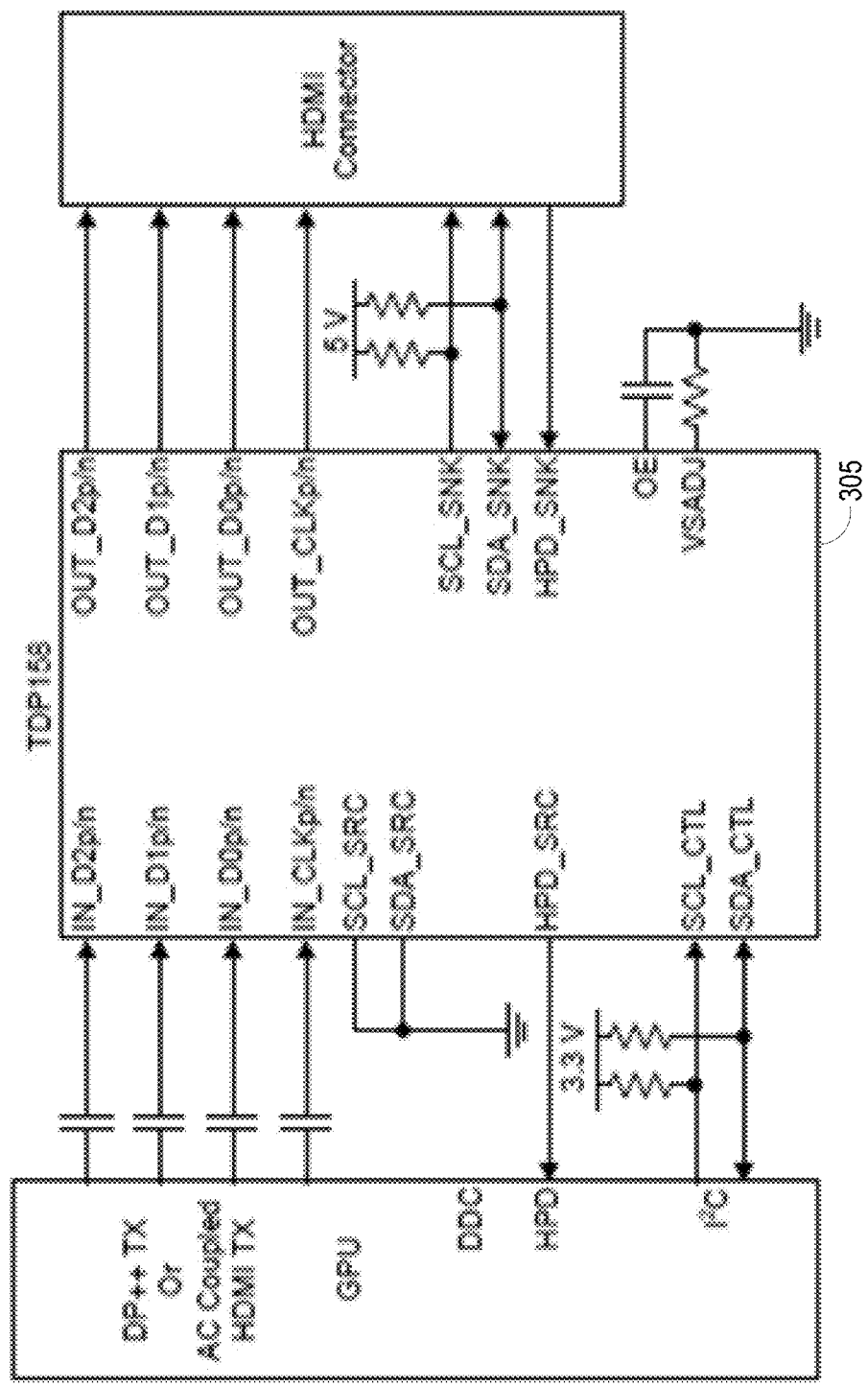
FIG. 8 is a block diagram illustrating an example schematic of an example HDMI level shifter redriver 305.

FIG. 8 is a block diagram illustrating an example schematic of an example HDMI level shifter redriver 305.

It is, of course, not possible to describe every conceivable combination of components or methodologies for purposes of describing the claimed subject matter, but one of ordinary skill in the art can recognize that further combinations and permutations of such matter are possible. Accordingly, the claimed subject matter is intended to embrace all such alterations, modifications and variations that fall within the spirit and scope of the appended claims.

We claim:

1. A customer premise equipment (CPE) device comprising:
a high-definition multimedia interface (HDMI) connector;
a system-on-chip (SoC);
an isolation block, wherein the isolation block includes:
an HDMI redriver, wherein the HDMI redriver converts AC-coupled TMDS to HDMI physical layer output, the HDMI physical layer output being a DC-coupled HDMI signal, wherein the AC-coupled TMDS is received by the HDMI redriver from the SoC and the HDMI physical layer output is output to the HDMI connector;
wherein each respective one signal path of one or more signal paths between the SoC and the HDMI redriver includes a capacitor that filters out a DC signal component of an AC-coupled TMDS, and wherein the isolation block blocks AC current.

2. The CPE device of claim 1, further comprising: an isolated DC-DC converter that includes one or more integrated field-effect transistors.

3. The CPE device of claim 1, further comprising: a boost converter that generates a voltage for HDMI.

4. The CPE device of claim 1, wherein the HDMI redriver is powered directly by an isolated fly-buck device.

5. The CPE device of claim 4, wherein the isolated fly-buck device outputs 3.3V.

6. The CPE device of claim 1, further comprising: one or more inter-integrated circuit isolators.

7. The CPE device of claim 6, wherein each inter-integrated circuit isolator comprises one or more logic input buffers and one or more logic output buffers, wherein the one or more logic input buffers are separated from the one or more logic output buffers by a silicon dioxide barrier.

8. The CPE device of claim 1, further comprising: a high-speed digital isolator.

9. The CPE device of claim 8, wherein the high-speed digital isolator comprises a quad-channel digital isolator with an integrated DC-DC converter.

10. The CPE device of claim 8, wherein the high-speed digital isolator prevents noise currents on a data bus from entering a local ground.

11. The CPE device of claim 10, wherein the data bus is consumer electronics control.

12. The CPE device of claim 10, wherein the data bus is hot-plug-detect.

13. The CPE device of claim 1, wherein the HDMI redriver isolates a ground connection from the SoC to a ground connection at the HDMI physical layer output to the HDMI connector.

14. A customer premise equipment (CPE) device comprising:
a high-definition multimedia interface (HDMI) connector;
a system-on-chip (SoC);
an isolation block;
wherein AC-coupled TMDS transmitted by the SoC is received by the HDMI redriver;
wherein the isolation block includes:
an HDMI redriver, wherein the HDMI redriver converts AC-coupled TMDS to HDMI physical layer output, the HDMI physical layer output being a DC-coupled HDMI signal, thereby blocking AC current.

15. The CPE device of claim 14, wherein the HDMI redriver isolates a ground connection from the SoC to a ground connection at the HDMI physical layer output to the HDMI connector.

* * * * *